US010846265B2

(12) United States Patent
Shi et al.

(10) Patent No.: US 10,846,265 B2
(45) Date of Patent: Nov. 24, 2020

(54) METHOD AND APPARATUS FOR ACCESSING FILE, AND STORAGE SYSTEM

(71) Applicant: Huawei Technologies Co., Ltd., Guangdong (CN)

(72) Inventors: Guojun Shi, Beijing (CN); Zhigang Li, Shenzhen (CN); Fuzhou Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 15/576,637

(22) PCT Filed: May 27, 2015

(86) PCT No.: PCT/CN2015/079894
§ 371 (c)(1),
(2) Date: Nov. 22, 2017

(87) PCT Pub. No.: WO2016/187831
PCT Pub. Date: Dec. 1, 2016

(65) Prior Publication Data
US 2018/0129672 A1    May 10, 2018

(51) Int. Cl.
*G06F 16/00* (2019.01)
*G06F 16/13* (2019.01)
(Continued)

(52) U.S. Cl.
CPC ............ *G06F 16/13* (2019.01); *G06F 3/06* (2013.01); *G06F 3/064* (2013.01); *G06F 3/0613* (2013.01);
(Continued)

(58) Field of Classification Search
None
See application file for complete search history.

(56) References Cited

U.S. PATENT DOCUMENTS 6,931,501 B1    8/2005    Narayanaswamy et al.
7,979,663 B2 *  7/2011    Tomonaga ............ G06F 3/0608
                                                        711/156

(Continued)

FOREIGN PATENT DOCUMENTS

CN    102460418 A    5/2012
CN    103914522 A    7/2014
(Continued)

*Primary Examiner* — Debbie M Le
(74) *Attorney, Agent, or Firm* — Kilpatrick Townsend & Stockton LLP

(57) ABSTRACT

A method and an apparatus for accessing a file, and a storage system. The method includes: determining L first-file invoking request messages; separately adding, according to physical sector information in the L first-file invoking request messages, the L first-file invoking request messages to M first-file dispatch queues; and processing a first-file invoking request message included in each first-file dispatch queue, to obtain an invoking request message of each first-file dispatch queue, where the invoking request message is used to access a first file. By means of the method and apparatus for accessing a file and the storage system in the embodiments of the present disclosure, a corresponding dispatch queue is allocated to an invoking request message of a micro file, so that combination processing can be performed on invoking request messages of multiple micro files, and a quantity of times of invoking a micro file is reduced.

18 Claims, 4 Drawing Sheets

(51) Int. Cl.
  *G06F 16/16* (2019.01)
  *G06F 16/182* (2019.01)
  *G06F 12/02* (2006.01)
  *G06F 3/06* (2006.01)
  *G06F 16/17* (2019.01)

(52) U.S. Cl.
  CPC .............. *G06F 12/02* (2013.01); *G06F 16/16* (2019.01); *G06F 16/1724* (2019.01); *G06F 16/182* (2019.01)

(56) References Cited

U.S. PATENT DOCUMENTS

| | | | | |
|---|---|---|---|---|
| 7,996,903 B2* | 8/2011 | Sprowls | ................. | G06F 21/78 711/162 |
| 8,578,126 B1* | 11/2013 | Gaonkar | ................. | G06F 3/061 711/201 |
| 8,768,980 B2* | 7/2014 | Tamas | ................... | G06F 16/13 707/812 |
| 9,009,388 B2* | 4/2015 | Patočka | .............. | G06F 12/0238 711/103 |
| 2010/0325264 A1 | 12/2010 | Crowder et al. | | |
| 2011/0035557 A1* | 2/2011 | Luukkainen | ............ | G06F 3/064 711/154 |
| 2011/0106806 A1 | 5/2011 | Tamas et al. | | |
| 2014/0351485 A1* | 11/2014 | Deng | ................... | G06F 12/0246 711/103 |
| 2015/0089097 A1 | 3/2015 | Isoda et al. | | |
| 2015/0143021 A1 | 5/2015 | Bruso et al. | | |
| 2015/0242310 A1* | 8/2015 | Guo | .................... | G06F 12/0238 711/103 |
| 2019/0010326 A1* | 1/2019 | Robertson | ............... | C08L 91/00 |

FOREIGN PATENT DOCUMENTS

| | | |
|---|---|---|
| CN | 104536959 A | 4/2015 |
| CN | 104571931 A | 4/2015 |
| CN | 104571952 A | 4/2015 |
| EP | 0375188 A2 | 6/1990 |
| JP | H11317008 A | 11/1999 |
| JP | 2009223507 A | 10/2009 |
| JP | 2015060486 A | 3/2015 |
| WO | 2010124291 A1 | 10/2010 |

* cited by examiner

100

```
┌─────────────────────────────────────────────────┐
│ Determine L first-file invoking request         │
│ messages, where each of the L first-file        │
│ invoking request messages is used to request    │
│ to invoke a first file, a size of the first     │
│ file is less than or equal to a threshold,      │
│ each first-file invoking request message        │──S110
│ includes physical sector information, the       │
│ physical sector information includes an address │
│ of a physical sector storing the first file,    │
│ and L is an integer greater than 1              │
└─────────────────────────────────────────────────┘
                        │
                        ▼
┌─────────────────────────────────────────────────┐
│ Separately add, according to the physical       │
│ sector information, the L first-file invoking   │
│ request messages to M first-file dispatch       │──S120
│ queues corresponding to the L first-file        │
│ invoking request messages, where M is a         │
│ positive integer                                │
└─────────────────────────────────────────────────┘
                        │
                        ▼
┌─────────────────────────────────────────────────┐
│ Process K first-file invoking request messages  │
│ that are included in each of the M first-file   │
│ dispatch queues, to obtain an invoking request  │
│ message of each first-file dispatch queue,      │──S130
│ where the invoking request message of each      │
│ first-file dispatch queue is used to request    │
│ to invoke first files corresponding to the K    │
│ first-file invoking request messages, and K is  │
│ a positive integer                              │
└─────────────────────────────────────────────────┘
                        │
                        ▼
┌─────────────────────────────────────────────────┐
│ Access, according to the invoking request       │
│ message of each first-file dispatch queue,      │──S140
│ the first files corresponding to the K          │
│ first-file invoking request messages            │
└─────────────────────────────────────────────────┘
                        │
                        ▼
┌─────────────────────────────────────────────────┐
│ Determine N first-file storage space groups     │
│ on the physical sector storing the file,        │──S150
│ where the N first-file storage space groups     │
│ are used to store the first file                │
└─────────────────────────────────────────────────┘
```

FIG. 2

METHOD AND APPARATUS FOR ACCESSING FILE, AND STORAGE SYSTEM

CROSS REFERENCE TO RELATED APPLICATIONS

This application is a national stage of International Application No. PCT/CN2015/079894, filed on May 27, 2015, which is hereby incorporated by reference in its entirety.

TECHNICAL FIELD

The present disclosure relates to the field of information technologies, and in particular, to a method and an apparatus for accessing a file, and a storage system.

BACKGROUND

In a file system, an inode (information node, information node) is usually allocated to each file, a data block is allocated to actual data corresponding to each file, and a number of the data block is recorded in the inode. A data block supported in the file system has a size of 1 K, 2 K, 4 K, or the like. During formatting, a size of a data block is fixed, and each data block has a number, to facilitate recording in the inode.

Because each data block can accommodate data of only one file in the prior art, a large quantity of micro files often exist in the file system, and for example, a micro file has a size of hundreds of bytes or smaller. If separate data blocks are allocated to such micro files, internal fragments are caused, and magnetic disk space is wasted. Moreover, frequent read/write of micro files further increases a quantity of input/output (I/O) times, causing excessive system invoking. The system invoking also causes context switching, and excessive CPU and memory resources are occupied. As a result, overall I/O efficiency of the file system is reduced.

SUMMARY

The present disclosure provides a method and an apparatus for accessing a file, and a storage system, so as to increase overall I/O efficiency of a file system.

According to a first aspect, a method for accessing a file is provided, where the method includes: determining L first-file invoking request messages, where each of the L first-file invoking request messages is used to request to invoke a first file, a size of the first file is less than or equal to a threshold, each first-file invoking request message includes physical sector information, the physical sector information includes an address of a physical sector storing the first file, and L is an integer greater than 1; separately adding, according to the physical sector information, the L first-file invoking request messages to M first-file dispatch queues corresponding to the L first-file invoking request messages, where M is a positive integer; processing K first-file invoking request messages that are included in each of the M first-file dispatch queues, to obtain an invoking request message of each first-file dispatch queue, where the invoking request message of each first-file dispatch queue is used to request to invoke first files corresponding to the K first-file invoking request messages, and K is a positive integer; and accessing, according to the invoking request message of each first-file dispatch queue, the first files corresponding to the K first-file invoking request messages.

With reference to the first aspect, in an implementation manner of the first aspect, the method further includes: determining N first-file storage space groups on the physical sector storing the file, where the N first-file storage space groups are used to store the first file, and N is a positive integer; and when at least two of the N first-file storage space groups have available storage space, combining first files included in the at least two first-file storage space groups; or when at least one of the N first-file storage space groups does not store a file, releasing the at least one first-file storage space group; or when none of the N first-file storage space groups has available storage space, increasing a quantity of the N first-file storage space groups; and the accessing, according to the invoking request message of each first-file dispatch queue, the first files corresponding to the K first-file invoking request messages includes: accessing, from the N first-file storage space groups according to the invoking request message of each first-file dispatch queue, the first files corresponding to the K first-file invoking request messages.

With reference to the first aspect and the foregoing implementation manner of the first aspect, in another implementation manner of the first aspect, the separately adding, according to the physical sector information, the L first-file invoking request messages to M first-file dispatch queues corresponding to the L first-file invoking request messages includes: adding at least two of the L first-file invoking request messages to a same first-file dispatch queue according to the physical sector information, where addresses of physical sectors of first files that the at least two first-file invoking request messages request to invoke are continuous.

With reference to the first aspect and the foregoing implementation manners of the first aspect, in another implementation manner of the first aspect, each first-file invoking request message further includes access path information, where the access path information is used to indicate a path, which is used for accessing the first file corresponding to each first file invoking message, of the physical sector.

With reference to the first aspect and the foregoing implementation manners of the first aspect, in another implementation manner of the first aspect, the determining L first-file invoking request messages includes: determining L first-file information nodes, where each of the L first-file information nodes is used to store the access path information of the first file that each first-file invoking request message requests to invoke; and determining, according to each first-file information node, the access path information of the first file that each first-file invoking request message requests to invoke.

With reference to the first aspect and the foregoing implementation manners of the first aspect, in another implementation manner of the first aspect, the determining L first-file information nodes includes: determining whether an $i^{th}$ first-file information node of the L first-file information nodes exists in an information node linked list; and when the $i^{th}$ first-file information node does not exist in the information node linked list, creating, in the information node linked list, the $i^{th}$ first-file information node, and storing access path information of an $i^{th}$ first file in the $i^{th}$ first-file information node; or when the $i^{th}$ first-file information node exists in the information node linked list, determining access path information of an $i^{th}$ first file according to the $i^{th}$ first-file information node.

According to a second aspect, an apparatus for accessing a file is provided, where the apparatus includes: a first determining module, configured to determine L first-file invoking request messages, where each of the L first-file invoking request messages is used to request to invoke a first file, a size of the first file is less than or equal to a threshold, each first-file invoking request message includes physical sector information, the physical sector information includes an address of a physical sector storing the first file, and L is an integer greater than 1; an allocation module, configured to separately add, according to the physical sector information, the L first-file invoking request messages determined by the first determining module to M first-file dispatch queues corresponding to the L first-file invoking request messages, where M is a positive integer; a processing module, configured to process K first-file invoking request messages that are included in each of the M first-file dispatch queues allocated by the allocation module, to obtain an invoking request message of each first-file dispatch queue, where the invoking request message of each first-file dispatch queue is used to request to invoke first files corresponding to the K first-file invoking request messages, and K is a positive integer; and an invoking module, configured to access, according to the invoking request message, which is obtained by the processing module, of each first-file dispatch queue, the first files corresponding to the K first-file invoking request messages.

With reference to the second aspect, in an implementation manner of the second aspect, the apparatus further includes: a second determining module, configured to determine N first-file storage space groups on the physical sector storing the file, where the N first-file storage space groups are used to store the first file; and when at least two of the N first-file storage space groups have available storage space, combine first files included in the at least two first-file storage space groups; or when at least one of the N first-file storage space groups does not store a file, release the at least one first-file storage space group; or when none of the N first-file storage space groups has available storage space, increase a quantity of the N first-file storage space groups; and the invoking module is further configured to access, from the N first-file storage space groups according to the invoking request message of each first-file dispatch queue, the first files corresponding to the K first-file invoking request messages.

With reference to the second aspect and the foregoing implementation manner of the second aspect, in another implementation manner of the second aspect, the processing module is specifically configured to add at least two of the L first-file invoking request messages to a same first-file dispatch queue according to the physical sector information, where addresses of physical sectors of first files that the at least two first-file invoking request messages request to invoke are continuous.

With reference to the second aspect and the foregoing implementation manners of the second aspect, in another implementation manner of the second aspect, each first-file invoking request message further includes access path information, where the access path information is used to indicate a path, which is used for accessing the first file corresponding to each first file invoking message, of the physical sector.

With reference to the second aspect and the foregoing implementation manners of the second aspect, in another implementation manner of the second aspect, the determining module is specifically configured to: determine L first-file information nodes, where each of the L first-file information nodes is used to store the access path information of the first file that each first-file invoking request message requests to invoke; and determine, according to each first-file information node, the access path information of the first file that each first-file invoking request message requests to invoke.

With reference to the second aspect and the foregoing implementation manners of the second aspect, in another implementation manner of the second aspect, the determining module is specifically configured to: determine whether an $i^{th}$ first-file information node of the L first-file information nodes exists in an information node linked list; and when the $i^{th}$ first-file information node does not exist in the information node linked list, create, in the information node linked list, the $i^{th}$ first-file information node, and store access path information of an $i^{th}$ first file in the $i^{th}$ first-file information node; or when the $i^{th}$ first-file information node exists in the information node linked list, determine access path information of an $i^{th}$ first file according to the $i^{th}$ first-file information node.

According to a third aspect, a storage system is provided, where the storage system includes: a memory, configured to store a file and a program; and a processor, configured to execute the program, so as to: determine L first-file invoking request messages, where each of the L first-file invoking request messages is used to request to invoke a first file, a size of the first file is less than or equal to a threshold, each first-file invoking request message includes physical sector information, the physical sector information includes an address of a physical sector storing the first file, and L is an integer greater than 1; separately add, according to the physical sector information, the L first-file invoking request messages to M first-file dispatch queues corresponding to the L first-file invoking request messages, where M is a positive integer; process K first-file invoking request messages that are included in each of the M first-file dispatch queues, to obtain an invoking request message of each first-file dispatch queue, where the invoking request message of each first-file dispatch queue is used to request to invoke first files corresponding to the K first-file invoking request messages, and K is a positive integer; and access, according to the invoking request message of each first-file dispatch queue, the first files corresponding to the K first-file invoking request messages.

With reference to the third aspect, in an implementation manner of the third aspect, the processor is further configured to: determine N first-file storage space groups on the physical sector storing the file, where the N first-file storage space groups are used to store the first file; and when at least two of the N first-file storage space groups have available storage space, combine first files included in the at least two first-file storage space groups; or when at least one of the N first-file storage space groups does not store a file, release the at least one first-file storage space group; or when none of the N first-file storage space groups has available storage space, increase a quantity of the N first-file storage space groups; and access, from the N first-file storage space groups according to the invoking request message of each first-file dispatch queue, the first files corresponding to the K first-file invoking request messages.

With reference to the third aspect and the foregoing implementation manner of the third aspect, in another implementation manner of the third aspect, the processor is specifically configured to add at least two of the L first-file invoking request messages to a same first-file dispatch queue according to the physical sector-information, where addresses of physical sectors of first files that the at least two first-file invoking request messages request to invoke are continuous.

With reference to the third aspect and the foregoing implementation manners of the third aspect, in another implementation manner of the third aspect, each first-file invoking request message further includes access path information, where the access path information is used to indicate a path, which is used for accessing the first file corresponding to each first file invoking message, of the physical sector.

With reference to the third aspect and the foregoing implementation manners of the third aspect, in another implementation manner of the third aspect, the processor is specifically configured to: determine L first-file information nodes, where each of the L first-file information nodes is used to store the access path information of the first file that each first-file invoking request message requests to invoke; and determine, according to each first-file information node, the access path information of the first file that each first-file invoking request message requests to invoke.

With reference to the third aspect and the foregoing implementation manners of the third aspect, in another implementation manner of the third aspect, the processor is specifically configured to: determine whether an $i^{th}$ first-file information node of the L first-file information nodes exists in an information node linked list; and when the $i^{th}$ first-file information node does not exist in the information node linked list, create, in the information node linked list, the $i^{th}$ first-file information node, and store access path information of an $i^{th}$ first file in the $i^{th}$ first-file information node; or when the $i^{th}$ first-file information node exists in the information node linked list, determine access path information of an $i^{th}$ first file according to the $i^{th}$ first-file information node.

Based on the foregoing technical solutions, by means of the method and apparatus for accessing a file, and the storage system in the embodiments of the present disclosure, invoking request messages of micro files are determined, and a corresponding first-file dispatch queue is allocated to the invoking request messages of the micro files, so that combination and/or deletion processing can be performed on the invoking request messages of the multiple micro files, and a quantity of times of invoking a micro file is reduced. In this way, it can be avoided that a quantity of I/O times is increased and excessive memory resources are occupied because micro file invoking requests increase, a quantity of times of system invoking is reduced, and a throughput of I/O requests is increased, thereby increasing overall I/O efficiency of a file system.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 2 is another schematic flowchart of a method for accessing a file according to an embodiment of the present disclosure;

DESCRIPTION OF EMBODIMENTS

The following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

According to preliminary statistics, a Linux system includes tens of thousands, even millions, of files. A file system uses a directory structure to organize stored data, and associates original information of the file system with actual data. Linux supports many different file systems, for example, ext4, F2FS, Brtfs, and Vfat. A Linux kernel associates different underlying file systems by using an additional software layer VFS.

According to an I/O access procedure, the system may be divided into five modules: a user layer (User Space), a file system layer, a block device layer, a multimedia card (MMC) driver layer, and hardware.

The User Space herein includes all application programs and a standard library that process I/O requests in the user space.

The file system layer, the block device layer, and the MMC driver layer run in kernel space.

The hardware refers to an MMC host controller, is mainly implemented depending on the JEDEC standard and hardware of vendors, and is not a focus of discussion of this patent.

Figure 1:
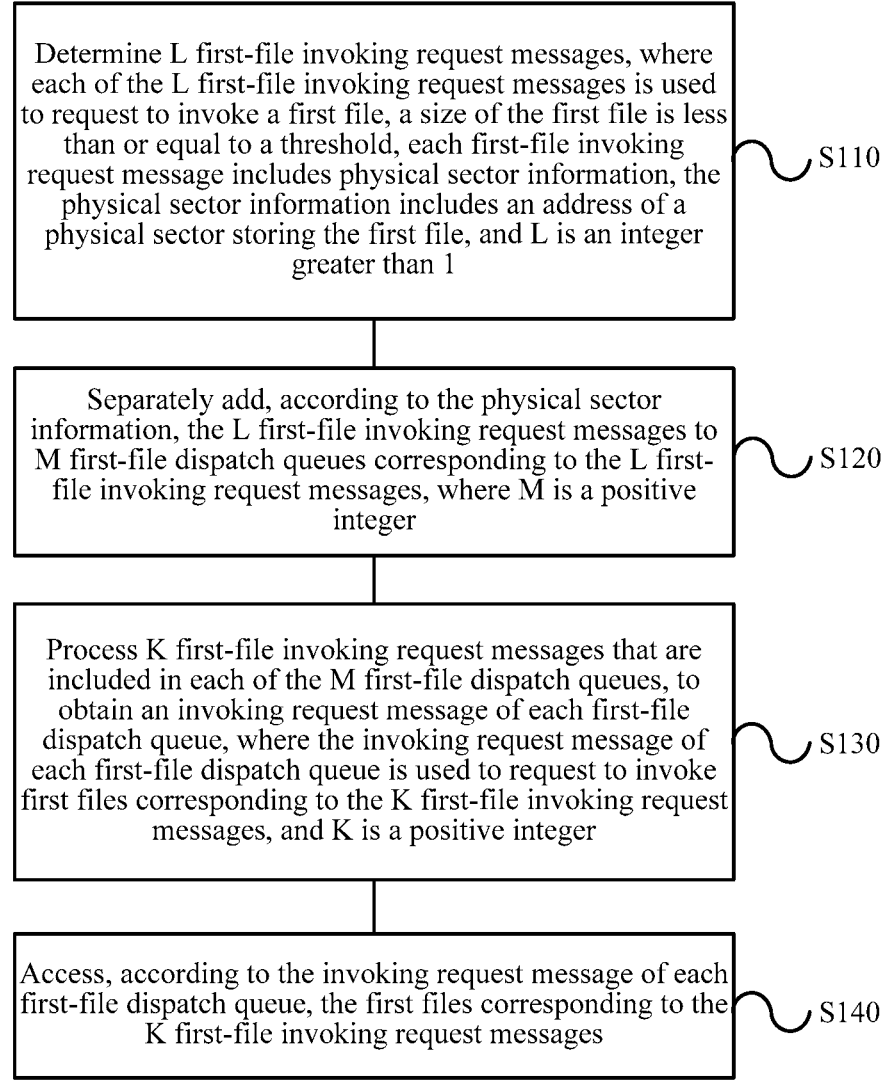
FIG. 1 is a schematic flowchart of a method for accessing a file according to an embodiment of the present disclosure.

FIG. 1 is a schematic flowchart of a method 100 for accessing a file according to an embodiment of the present disclosure. The method 100 may be performed by the block device layer in the file system. As shown in FIG. 1, the method 100 includes:

S110: Determine L first-file invoking request messages, where each of the L first-file invoking request messages is used to request to invoke a first file, a size of the first file is less than or equal to a threshold, each first-file invoking request message includes physical sector information, the physical sector information includes an address of a physical sector storing the first file, and L is an integer greater than 1.

S120: Separately add, according to the physical sector information, the L first-file invoking request messages to M first-file dispatch queues corresponding to the L first-file invoking request messages, where M is a positive integer.

S130: Process K first-file invoking request messages that are included in each of the M first-file dispatch queues, to obtain an invoking request message of each first-file dispatch queue, where the invoking request message of each first-file dispatch queue is used to request to invoke first files corresponding to the K first-file invoking request messages, and K is a positive integer.

S140: Access, according to the invoking request message of each first-file dispatch queue, the first files corresponding to the K first-file invoking request messages.

Specifically, the L first-file invoking request messages are determined from file invoking request messages sent by user equipment, where L is an integer greater than 1. The first-file invoking request message is used to invoke a first file, the first file is a micro file, each first-file invoking request message includes physical sector information, and the physical sector information includes an address of a physical sector storing a corresponding micro file. M first-file dispatch queues are allocated to the L first-file invoking request messages, where M is a positive integer. The L first-file invoking request messages are separately added to the M first-file dispatch queues according to the physical sector information in each first-file invoking request message. K first-file invoking request messages allocated to each first-file dispatch queue are processed. For example, combination and/or deletion processing may be performed on the K first-file invoking request messages. Therefore, an invoking request message corresponding to each first-file dispatch queue is obtained. First files corresponding to the K first-file invoking request messages are invoked according to the invoking request message of each first-file dispatch queue. For example, the first file may be accessed.

Therefore, by means of the method for accessing a file in this embodiment of the present disclosure, invoking request messages of micro files are determined, and a corresponding first-file dispatch queue is allocated to the invoking request messages of the micro files, so that combination and/or deletion processing can be performed on the invoking request messages of the multiple micro files, and a quantity of times of invoking a micro file is reduced. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system.

In S110, the file system may determine L first-file invoking request messages from received file invoking request messages, where L is a positive integer greater than 1. Each first file request message of the L first-file invoking request messages is used to request to invoke one corresponding first file. Optionally, the first file is a micro file (MF). According to an actual application, a threshold may be set. A file whose file size is less than or equal to the threshold is determined as a micro file, that is, a first file. For example, the threshold may be set to 1 K, that is, a file whose file size is less than or equal to 1 K is defined as a micro file, and the threshold may also be set to 2 M, 4 M, or the like. The present disclosure is not limited thereto. In this way, the file system may determine invoking request messages of micro files from the received file invoking request messages, and the invoking request messages of these micro files are used to request to invoke the corresponding micro files from the file system.

In this embodiment of the present disclosure, the file system determines the L first-file invoking request messages, and may receive one first-file invoking request message at a time, or may receive multiple first-file invoking request messages at a time. For example, the file system may receive three first-file invoking request messages at a time. In this case, when the file system determines the L first-file invoking request messages, the file system determines three received first-file invoking request messages. Alternatively, the file system may also receive a random quantity of first-file invoking request messages. When the quantity increases to L, the file system determines the L first-file invoking request messages. A value of L may be determined according to an actual application, or may be set according to an empirical value. The present disclosure is not limited thereto.

Optionally, in this embodiment of the present disclosure, each first-file invoking request message may include the physical sector information, and the physical sector information includes the address of the physical sector storing the first file that each first-file invoking request message requests to invoke. Optionally, the physical sector information may specifically include at least one of a start address of the first file that each first-file invoking request message requests to invoke, a size of the invoked first file, or related information of a device delivering the first-file invoking request message. The file system may determine, according to the first-file invoking request message including the physical sector information, the first file needing to be invoked.

Optionally, in this embodiment of the present disclosure, the first-file invoking request message may further include access path information, the access path information includes path information of the physical sector that correspondingly stores the first file, and the physical sector storing the corresponding first file, that is, the physical sector storing the micro file, may be found in the file system according to the access path information. Specifically, when one file is opened or closed or a new file is created, a kernel of the file system allocates one file descriptor and returns the file descriptor to a user program, and a pointer in an entry of the file descriptor points to the newly opened file. When a file is accessed, the user program transmits the file descriptor to the kernel, and the kernel finds the corresponding entry according to the file descriptor, and finds the corresponding file by using the pointer in the entry. Each file structure has a pointer pointing to a dentry (directory entry, directory entry) structure, and an inode of a file can be found according to a path. To reduce a quantity of times of reading a disk, the kernel usually caches a tree-like structure of a directory, and the tree-like structure of the directory is referred to as a dentry cache. Each inode is a dentry structure. A search only needs to be performed along dentries of parts of the path. The dentry cache stores only a recently accessed directory entry. If there is no hit, a directory entry needs to be read from the magnetic disk to a memory.

Specifically, for a micro file, the file system may store a micro file-information node MF-inode in a form of a linked list. These micro file-information nodes store access path information of the corresponding micro files, and a micro file may be searched for according to the access path information in the information node. When receiving an $i^{th}$ first-file invoking request message, the file system searches for a corresponding information node of an $i^{th}$ first file in a stored MF-inode linked list; and if the information node of the $i^{th}$ first file exists in the linked list, determines, according to the information node of the $i^{th}$ first file, the access path information used to indicate a storage path of the first file, where the access path information may be stored in the $i^{th}$ first-file invoking request message. When the corresponding information node of the $i^{th}$ first file cannot be found in the MF-inode linked list, a new inode corresponding to the $i^{th}$ first file is applied for, the new inode is added to the MF-inode linked list, the storage path and a file name that correspond to the first file are stored in the new inode, and are recorded as member variables of the inode, and the access path information is also stored in the $i^{th}$ first-file invoking request message.

Optionally, for an MF-inode linked list corresponding to a micro file, when a file corresponding to an inode included in the MF-inode linked list turns from a micro file to a macro file because file data is continuously written, for example, when a size of the micro file exceeds 4 M, a truncation (O_TRUNC) operation may be invoked, so that the macro file is truncated into micro files. Alternatively, the file that has become macro may be removed from the MF-inode linked list of the micro file, and a common inode is allocated to the file. Because performance is not affected, the status quo may also be maintained. In contrast, when a macro file turns into a micro file, the micro file may be added to the MF-inode linked list. Optionally, this may be completed by using a disk defragmenter program (defragment daemon) when the system is idle.

In this embodiment of the present disclosure, an I/O scheduler of Linux is a main component of an I/O subsystem of a block device, and is located between a universal block layer and a block device driver. When a Linux kernel component needs to read/write some data, once a request is sent, the kernel postpones execution of the request instead of executing the request immediately. Allocation postponement is a key mechanism of performance of the block device. When transmitting a new data block, the kernel checks whether a new request can be met by extending a previous request that is in a waiting state all the time.

Specifically, each block device program is associated with a request queue. During initialization of the block device, the request queue is allocated and initialized. In this case, a particular I/O scheduling algorithm may be specified for the block device driver. In a default case, a default scheduling algorithm of the system is used. In the default scheduling algorithm, a request that is closest to a previous processed request is processed first, and therefore, a request is ignored for a very long time; this case is an elevator algorithm. To avoid such a case, when a request is transmitted to the elevator algorithm, a timeout timer is started, so as to avoid a case in which a request stays unprocessed. To improve user experience, a read request generally takes precedence over a write request, because the read request usually blocks a process that sends the request.

In this embodiment of the present disclosure, the invoking request message of the micro file may be processed by using this algorithm; and optionally, may be further scheduled by using the following I/O scheduling (scheduler) algorithm method. In S120, the L first-file invoking request messages may be separately added to the M first-file dispatch queues (MF dispatch Queue) according to the physical sector information in the L first-file invoking request messages, where M is an integer. The file system allocates a corresponding first-file dispatch queue to the invoking request message of the micro file. For the first-file invoking request message received by the file system, the L first-file invoking request messages may be separately added to the M first-file dispatch queues according to the physical sector information in each invoking request message, so that at least two first-file invoking request messages whose physical sectors have continuous addresses are added to a same first-file dispatch queue, where each first-file dispatch queue includes K first-file invoking request messages, and both K and M are positive integers.

For example, in this embodiment of the present disclosure, the file system determines six first-file invoking request messages, that is, L=6. When there is only one first-file dispatch queue, that is, a dispatch queue of the micro file, M=1, and physical sector information in three first-file invoking request messages of the six first-file invoking request messages snows that addresses of physical sectors of the three first-file invoking request messages are continuous, and the rest three are discontinuous. The sixth first-file invoking request messages are all placed into the first-file dispatch queue, and the three first-file invoking request messages whose physical sectors have continuous addresses are combined, that is, in this case, K=3. The rest three first-file invoking request messages whose physical sectors have discontinuous addresses are temporarily not processed. When there is a new first-file invoking request message, whether addresses of physical sectors are continuous is determined again. If continuous, combination is performed; or if discontinuous, processing is still not performed. Optionally, whether combination processing is performed is determined by determining whether addresses of physical sectors are continuous. First file invoking request information may be further combined according to sizes of invoked first files. For example, when a sum of sizes of two first files that two first-file invoking request messages request to write may exactly constitute one data block (block), the two first-file invoking request messages may also be combined, and the corresponding first files that the two first-file invoking request messages request to write are written to a same physical sector in a same data block. The present disclosure is not limited thereto.

Optionally, for another example, the file system determines six first-file invoking request messages, that is, L=6. When a first-file dispatch queue is divided into five dispatch queues, that is, there are five dispatch queues of micro files, M=5, and physical sector information in three first-file invoking request messages of the six first-file invoking request messages shows that addresses of physical sectors of the three first-file invoking request messages are continuous, and the rest three are discontinuous. The three first-file invoking request messages whose physical sectors have the continuous addresses are placed into a same first-file dispatch queue. For example, the three first-file invoking request messages are placed into a first first-file dispatch queue, the rest three first-file invoking request messages whose physical sectors have discontinuous addresses may be placed into other three first-file dispatch queues, and one rest first-file dispatch queue is temporarily empty. In this case, three first-file invoking request messages exist in the first first-file dispatch queue, that is, K=3. In this case, combination processing may be performed on the three first-file invoking request messages in the first-file dispatch queue to obtain one invoking request message of the first-file dispatch queue. Combination processing may first not be performed on the other three dispatch queues that respectively have one first-file invoking request message, and the other three dispatch queues continue to wait for allocation of another first-file invoking request message. When multiple first-file invoking request messages that can be combined exist in the several first-file dispatch queues, similarly, as in the case of the first first-file dispatch queue, the multiple first-file invoking request messages that are in a same first-file dispatch queue are combined. Optionally, whether combination processing is performed is determined by determining whether addresses of physical sectors are continuous. First file invoking request information may be further combined according to sizes of invoked first files. For example, when a sum of sizes of two first files that two first-file invoking request messages request to write may exactly constitute one data block (block), the two first-file invoking request messages may also be combined, and the corresponding first files that the two first-file invoking request messages request to write are written to a same physical sector in a same data block. The present disclosure is not limited thereto.

Optionally, for another example, the file system determines six first-file invoking request messages, that is, L=6. If there are three first-file dispatch queues, that is, M=3, and physical sector information in three first-file invoking request messages of the six first-file invoking request messages shows that addresses of physical sectors of the three first-file invoking request messages are continuous, and the rest three are discontinuous. The three first-file invoking request messages whose physical sectors have continuous addresses are placed into a same first-file dispatch queue, for example, the three first-file invoking request messages are placed in a first first-file dispatch queue, and the rest three first-file invoking request messages whose physical addresses are discontinuous may be allocated to three first-file dispatch queues according to sizes of the first-file invoking request messages or randomly; or may be allocated to three first-file dispatch queues according to correlation of storage addresses of first files that the first-file invoking request messages request to invoke; or may be randomly allocated to three first-file dispatch queues. Then, combination processing is performed on the three first-file invoking request messages whose physical sector information is continuous and that are in the first first-file dispatch queue to obtain one invoking request message of the first-file dispatch queue. The other two first-file dispatch queues may first not be processed, or if first-file invoking request messages that are not combined still exist in the first first-file dispatch queue, processing is also not performed temporarily. When multiple first-file invoking request messages that can be combined exist in the several first-file dispatch queues, similarly, as in the case of the first first-file dispatch queue, multiple first-file invoking request messages in a same first-file dispatch queue are combined. Optionally, whether combination processing is performed is determined by determining whether addresses of physical sectors are continuous. First file invoking request information may be further combined according to sizes of invoked first files. For example, when a sum of sizes of two first files that two first-file invoking request messages request to write may exactly constitute one data block (block), the two first-file invoking request messages may also be combined, and the corresponding first files that the two first-file invoking request messages request to write are written to a same physical sector in a same data block. The present disclosure is not limited thereto.

Optionally, the invoking request messages received by the file system may be grouped according to different process IDs (PID) of the L first-file invoking request messages. Then, a first-file invoking request message of the grouped invoking request messages is stored in the first-file dispatch queue, where the first-file dispatch queue may include M dispatch queues. Optionally, a structure may be newly added to the file system, and is used to determine which invoking request messages are first-file invoking request messages. Alternatively, when a first-file invoking request message is determined in S110, the first-file invoking request message may be identified, the first-file invoking request message is distinguished by using an identifier, and the first-file invoking request message is allocated to the corresponding M first-file dispatch queues, where each first file dispatch queue may include K first-file invoking request messages.

In S130, each of the M first-file dispatch queues in the file system may process the K first-file invoking request messages included in each first-file dispatch queue, to obtain an invoking request message of each first-file dispatch queue. Specifically, the L first-file invoking request messages are added to the M first-file dispatch queues. For each first-file dispatch queue, when at least two first-file invoking request messages included in each first-file dispatch queue have continuous physical sector (bi_sector) addresses, combination processing may be performed on the at least two first-file invoking request messages, so that the at least two first-file invoking request messages may be combined into one invoking request message, that is, the invoking request message of the first-file dispatch queue, so as to reduce a quantity of times of invoking. For example, for any first-file dispatch queue, the first-file dispatch queue includes K first-file invoking request messages, and the K first-file invoking request messages may be processed according to physical sector information included in the K first-file invoking request messages, to generate one invoking request message of the first-file dispatch queue, where the invoking request message of the first-file dispatch queue is used to invoke first files corresponding to the K first-file invoking request messages. Optionally, the file system may further perform deletion processing on the first-file invoking request message, to delete an unnecessary invoking request. In this way, the quantity of times of invoking may also be reduced.

Optionally, when a first-file dispatch queue includes only one first-file invoking request message, that is, there is no another invoking request message, where a physical sector of the another invoking request message and the physical sector of the invoking request message have continuous addresses, the first-file invoking request message may temporarily not be processed. When addresses of physical sectors of the at least two first-file invoking request messages included in the first-file dispatch queue are continuous, combination processing is then performed. The present disclosure is not limited thereto.

In S140, after performing combination or deletion processing on the K first-file invoking request messages included in the first-file dispatch queue, the file system may access a corresponding first file according to the obtained invoking request message of the first-file dispatch queue. Specifically, because each first-file invoking request message may include access path information, after combination is performed for the first-file dispatch queue, the invoking request message of each first-file dispatch queue still has corresponding access path information. Therefore, access processing may be correspondingly performed on the first file according to the access path information. Optionally, the invoking request message of the first-file dispatch queue may be sent to a storage medium request queue (mmc_request), the mmc_request processes the invoking request message of the first-file dispatch queue, and sets a device controller, where the device controller is mainly used to generate and transmit data. After data transmission is completed, a current invoking request message may be deleted from a corresponding dispatch queue, and data transmission corresponding to a next request is started.

It should be understood that sequence numbers of the foregoing processes do not mean executing sequences in the embodiments of the present disclosure. The executing sequences of the processes shall be determined according to functions and internal logic of the processes, but shall not constitute any limitation to the implementation processes of the embodiments of the present disclosure.

Therefore, by means of the method for accessing a file in this embodiment of the present disclosure, invoking request messages of micro files are determined, and a corresponding first-file dispatch queue is allocated to the invoking request messages of the micro files, so that combination and/or deletion processing can be performed on the invoking request messages of the multiple micro files, and a quantity of times of invoking a micro file is reduced. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system.

Optionally, in an embodiment, the method 100 for accessing a file in this embodiment of the present disclosure further includes:

S150: Determine N first-file storage space groups on the physical sector storing the file, where the N first-file storage space groups are used to store the first file.

In this embodiment of the present disclosure, specifically, the file system may set an independent physical sector for access of a micro file. The physical sector includes multiple independent areas, the area includes multiple first-file storage space groups (MF Group), a size of the area may be adjusted and optimized according to a timeslot application, and a quantity of MF Groups included in the area may be dynamically adjusted according to requirements. Optionally, for multiple MF Groups independently storing micro files, each MF Group may include multiple data blocks (data block), and each data block may store one or more micro files. The present disclosure is not limited thereto.

Specifically, multiple MF Groups may be combined and/or deleted by using a disk defragmenter program (defragment daemon) when the system is idle. For example, the multiple MF Groups may be combined, ensuring that multiple first files are stored on continuous physical sectors, so that a feature of an eMMC may be better used. During running of the system, because of a deletion operation of a file, space in some MF Groups that is used to store files is surplus, that is, most space in the MF Groups is added to a to-be-deleted list. These MF Groups may be combined, to combine data in at least two MF Groups and store the data in one or more MF Groups. Therefore, more space is released, and space utilization is improved.

Optionally, in an embodiment, deletion processing may also be performed on MF Groups. For example, when some micro files existing in an MF Group turns into a macro file, for example, a size of the macro file exceeds a range of 4 M, the MF Group in which the file becomes macro may be found and identified. Then, when traversing the to-be-deleted list, the defragment daemon finds that first files included in the MF Group are all added to the to-be-deleted list, so that deletion is performed when no file exists in the MF Group, that is, the MF Groups are empty, and the MF Group is deleted to release a resource.

Optionally, in an embodiment, addition processing may also be performed on an MF Group. For example, when a micro file is newly added, for example, when a macro file turns into a micro file, the defragment daemon first searches multiple MF Groups for an MF Group having surplus space. If available storage space that may enable the micro file to be stored in the MF Group exists, the newly added micro file is stored in the MF Group. If there is no MF Group having surplus space, the defragment daemon adds a new MF Group, where the new MF Group is used to store the micro file and another newly added micro file.

In this embodiment of the present disclosure, the file system may search, according to an invoking request message of at least one first-file dispatch queue, the MF Group storing files for a first file that needs to be accessed and invoked.

It should be understood that sequence numbers of the foregoing processes do not mean executing sequences in the embodiments of the present disclosure. The executing sequences of the processes shall be determined according to functions and internal logic of the processes, but snail not constitute any limitation to the implementation processes of the embodiments of the present disclosure.

Therefore, by means of the method for accessing a file in this embodiment of the present disclosure, invoking request messages of micro files are determined, and a corresponding first-file dispatch queue is allocated to the invoking request messages of the micro files, so that combination and/or deletion processing can be performed on the invoking request messages of the multiple micro files. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system. In addition, a corresponding dynamic storage area may be further allocated to a micro file, and different micro files are gathered for storage. In this way, a waste of storage space may be reduced, and space utilization is improved.

Figure 3:
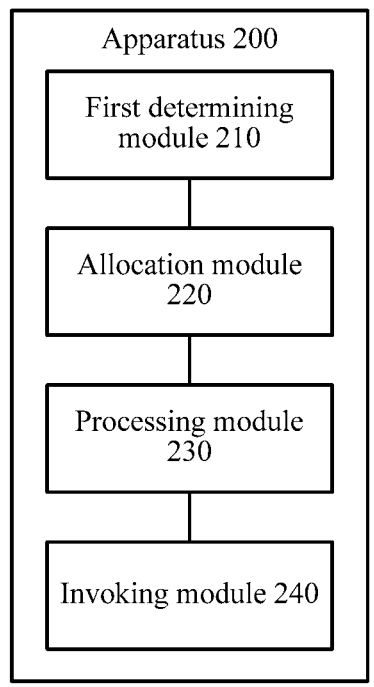
FIG. 3 is a schematic block diagram of an apparatus 200 for accessing a file according to an embodiment of the present disclosure.
Figure 4:
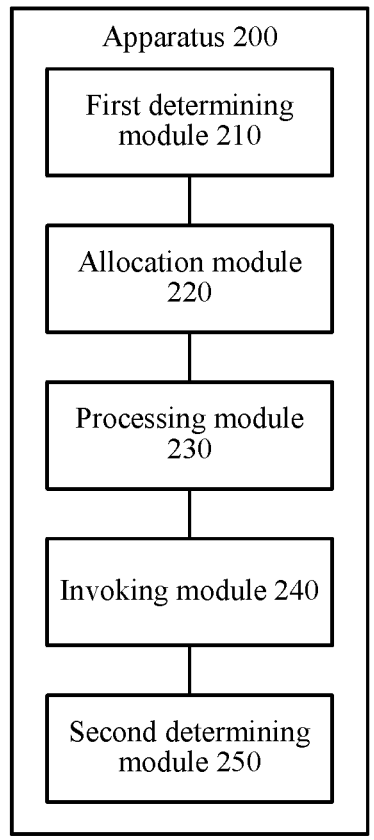
FIG. 4 is another schematic block diagram of an apparatus 200 for accessing a file according to an embodiment of the present disclosure.

With reference to FIG. 1 and FIG. 2, the method for accessing a file according to this embodiment of the present disclosure is described above in detail. With reference to FIG. 3 and FIG. 4, an apparatus 200 for accessing a file according to an embodiment of the present disclosure is described below.

As shown in FIG. 3, the apparatus 200 for accessing a file according to this embodiment of the present disclosure includes:

a first determining module 210, configured to determine L first-file invoking request messages, where each of the L first-file invoking request messages is used to request to invoke a first file, a size of the first file is less than or equal to a threshold, each first-file invoking request message includes physical sector information, the physical sector information includes an address of a physical sector storing the first file, and L is an integer greater than 1;

an allocation module 220, configured to separately add, according to the physical sector information, the L first-file invoking request messages determined by the first determining module to M first-file dispatch queues corresponding to the L first-file invoking request messages, where M is a positive integer;

a processing module 230, configured to process K first-file invoking request messages that are included in each of the M first-file dispatch queues allocated by the allocation module, to obtain an invoking request message of each first-file dispatch queue, where the invoking request message of each first-file dispatch queue is used to request to invoke first files corresponding to the K first-file invoking request messages, and K is a positive integer; and an invoking module 240, configured to access, according to the invoking request message, which is obtained by the processing module, of each first-file dispatch queue, the first files corresponding to the K first-file invoking request messages.

Specifically, the determining module 210 determines L first-file invoking request messages from file invoking request messages sent by user equipment, where L is an integer greater than 1. The first-file invoking request message is used to invoke a first file, the first file is a micro file, each micro file invoking request message may include physical sector information, and the physical sector information includes an address of a physical sector storing the micro file. The allocation module 220 allocates M first-file dispatch queues to the L first-file invoking request messages determined by the determining module 210, where M is a positive integer; and separately adds the L first-file invoking request messages to the M first-file dispatch queues according to the physical sector information in each first-file invoking request message. For each first-file dispatch queue, the processing module 230 processes K first-file invoking request messages allocated to each first-file dispatch queue, for example, may perform combination and/or deletion processing on the K first-file invoking request messages, so that an invoking request message corresponding to each first-file dispatch queue is obtained. The invoking module 240 may invoke first files corresponding to the K first-file invoking request messages according to the invoking request message of each first-file dispatch queue, for example, may access the first files.

Therefore, the apparatus for accessing a file in this embodiment of the present disclosure determines invoking request messages of micro files, and allocates a corresponding first-file dispatch queue to the invoking request messages of the micro files, so that combination and/or deletion processing can be performed on the invoking request messages of the multiple micro files, and a quantity of times of invoking a micro file is reduced. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system.

In this embodiment of the present disclosure, the determining module 210 of the apparatus 200 for accessing a file in the file system may determine the L first-file invoking request messages from the received file invoking request messages. Each first file request message of the L first-file invoking request messages is used to request to invoke one corresponding first file. Optionally, the first file is a micro file (MF). According to an actual application, a threshold may be set. A file whose file size is less than or equal to the threshold is determined as a micro file, that is, a first file. For example, the threshold may be set to 1 K, that is, a file whose file size is less than or equal to 1 K is defined as a micro file, and the threshold may also be set to 2 M, 4 M, or the like. The present disclosure is not limited thereto. In this way, the file system may determine invoking request messages of micro files from the received file invoking request messages, and the invoking request messages of these micro files are used to request to invoke the corresponding micro files from the file system.

In this embodiment of the present disclosure, the file system determines the L first-file invoking request messages, and may receive one first-file invoking request message at a time, or may receive multiple first-file invoking request messages at a time. For example, the file system may receive three first-file invoking request messages at a time. In this case, when the file system determines the L first-file invoking request messages, the file system determines three received first-file invoking request messages. Alternatively, the file system may also receive a random quantity of first-file invoking request messages. When the quantity increases to L, the file system determines the L first-file invoking request messages. A value of L may be determined according to an actual application, or may be set according to an empirical value. The present disclosure is not limited thereto.

Optionally, in this embodiment of the present disclosure, each of the L first-file invoking request messages determined by the determining module 210 of the apparatus 200 for accessing a file may include the physical sector information, where the physical sector information includes the address of the physical sector storing the first file that each first-file invoking request message requests to invoke. Optionally, the physical sector information may specifically include a start address of the first file that each first-file invoking request message requests to invoke, a size of the invoked first file, related information of a device delivering the first-file invoking request message, and the like. The file system may determine, according to the first-file invoking request message including the physical sector information, the first file needing to be invoked.

Optionally, in this embodiment of the present disclosure, the first-file invoking request message determined by the determining module 210 may further include access path information, the access path information includes path information of the physical sector that correspondingly stores the first file, and the physical sector storing a corresponding micro file may be found in the file system according to the access path information. Specifically, when one file is opened open or closed close or a new file is created, a kernel of the file system allocates one file descriptor and returns the file descriptor to a user program, and a pointer in an entry of the file descriptor points to the newly opened file. When a file is accessed, the user program transmits the file descriptor to the kernel, and the kernel finds the corresponding entry according to the file descriptor, and finds the corresponding file by using the pointer in the entry. Each file structure has a pointer pointing to a dentry (directory entry, directory entry) structure, and an inode of a file can be found according to a path. To reduce a quantity of times of reading a disk, the kernel usually caches a tree-like structure of a directory, and the tree-like structure of the directory is referred to as a dentry cache. Each inode is a dentry structure. A search only needs to be performed along dentries of parts of the path. The dentry cache stores only a recently accessed directory entry. If there is no hit, a directory entry needs to be read from the magnetic disk to a memory.

Specifically, for a micro file, the file system may store a micro file-information node MF-inode in a form of a linked list. These micro file-information nodes store access path information of the corresponding micro files, and a micro file may be searched for according to the access path information in the information node. When receiving an $i^{th}$ first-file invoking request message, the file system searches for a corresponding information node of an $i^{th}$ first file in a stored MF-inode linked list; and if the information node of the $i^{th}$ first file exists in the linked list, determines, according to the information node of the $i^{th}$ first file, the access path information used to indicate a storage path of the first file, where the access path information may be stored in the $i^{th}$ first-file invoking request message. When the corresponding information node of the $i^{th}$ first file cannot be found in the MF-inode linked list, a new inode corresponding to the $i^{th}$ first file is applied for, the new inode is added to the MF-inode linked list, the storage path and a file name that correspond to the first file are stored in the new inode, and are recorded as member variables of the inode, and the access path information is also stored in the $i^{th}$ first-file invoking request message.

Optionally, for an MF-inode linked list corresponding to a micro file, when a file corresponding to an inode included in the MF-inode linked list turns from a micro file to a macro file because file data is continuously written, for example, when a size of the micro file exceeds 4 M, a truncation (O_TRUNC) operation may be invoked, so that the macro file is truncated into micro files. Alternatively, the file that has become macro may be removed from the MF-inode linked list of the micro file, and a common inode is allocated to the file. Because performance is not affected, the status quo may also be maintained. In contrast, when a macro file turns into a micro file, the micro file may be added to the MF-inode linked list. Optionally, this may be completed by using a disk defragmenter program (defragment daemon) when the system is idle.

In this embodiment of the present disclosure, an I/O scheduler of Linux is a main component of an I/O subsystem of a block device, and is located between a universal block layer and a block device driver. When a Linux kernel component needs to read/write some data, once a request is sent, the kernel postpones execution of the request instead of executing the request immediately. Allocation postponement is a key mechanism of performance of the block device. When transmitting a new data block, the kernel checks whether a new request can be met by extending a previous request that is in a waiting state all the time.

Specifically, each block device program is associated with a request queue. During initialization of the block device, the request queue is allocated and initialized. In this case, a particular I/O scheduling algorithm may be specified for the block device driver. In a default case, a default scheduling algorithm of the system is used. In the default scheduling algorithm, a request that is closest to a previous processed request is processed first, and therefore, a request is ignored for a very long time; this case is an elevator algorithm. To avoid such a case, when a request is transmitted to the elevator algorithm, a timeout timer is started, so as to avoid a case in which a request stays unprocessed. To improve user experience, a read request generally takes precedence over a write request, because the read request usually blocks a process that sends the request.

In this embodiment of the present disclosure, the invoking request message of the micro file may be processed by using this algorithm; and optionally, may be further scheduled by using the following I/O scheduling (scheduler) algorithm method. In this embodiment of the present disclosure, the allocation module 220 may separately add the L first-file invoking request messages to the M first-file dispatch queues (MF dispatch Queue) according to the physical sector information in the L first-file invoking request messages. The file system allocates a corresponding first-file dispatch queue to the invoking request message of the micro file. For the first-file invoking request message received by the file system, the L first-file invoking request messages may be separately added to the M first-file dispatch queues according to the physical sector information in each invoking request message, so that at least two first-file invoking request messages whose physical sectors have continuous addresses are added to a same first-file dispatch queue, where each first-file dispatch queue includes K first-file invoking request messages, and both K and M are positive integers.

For example, in this embodiment of the present disclosure, the file system determines six first-file invoking request messages, that is, L=6. When there is only one first-file dispatch queue, that is, a dispatch queue of the micro file, M=1, and physical sector information in three first-file invoking request messages of the six first-file invoking request messages snows that addresses of physical sectors of the three first-file invoking request messages are continuous, and the rest three are discontinuous. The sixth first-file invoking request messages are all placed into the first-file dispatch queue, and the three first-file invoking request messages whose physical sectors have continuous addresses are combined, that is, in this case, K=3. The rest three first-file invoking request messages whose physical sectors have discontinuous addresses are temporarily not processed. When there is a new first-file invoking request message, whether addresses of physical sectors are continuous is determined again. If continuous, combination is performed; or if discontinuous, processing is still not performed. Optionally, whether combination processing is performed is determined by determining whether addresses of physical sectors are continuous. First file invoking request information may be further combined according to sizes of invoked first files. For example, when a sum of sizes of two first files that two first-file invoking request messages request to write may exactly constitute one data block (block), the two first-file invoking request messages may also be combined, and the corresponding first files that the two first-file invoking request messages request to write are written to a same physical sector in a same data block. The present disclosure is not limited thereto.

Optionally, for another example, the file system determines six first-file invoking request messages, that is, L=6. When a first-file dispatch queue is divided into five dispatch queues, that is, there are five dispatch queues of micro files, M=5, and physical sector information in three first-file invoking request messages of the six first-file invoking request messages shows that addresses of physical sectors of the three first-file invoking request messages are continuous, and the rest three are discontinuous. The three first-file invoking request messages whose physical sectors have the continuous addresses are placed into a same first-file dispatch queue. For example, the three first-file invoking request messages are placed into a first first-file dispatch queue, the rest three first-file invoking request messages whose physical sectors have discontinuous addresses may be placed into other three first-file dispatch queues, and one rest first-file dispatch queue is temporarily empty. In this case, three first-file invoking request messages exist in the first first-file dispatch queue, that is, K=3. In this case, combination processing may be performed on the three first-file invoking request messages in the first-file dispatch queue to obtain one invoking request message of the first-file dispatch queue. Combination processing may first not be performed on the other three dispatch queues that respectively have one first-file invoking request message, and the other three dispatch queues continue to wait for allocation of another first-file invoking request message. When multiple first-file invoking request messages that can be combined exist in the several first-file dispatch queues, similarly, as in the case of the first first-file dispatch queue, the multiple first-file invoking request messages that are in a same first-file dispatch queue are combined. Optionally, whether combination processing is performed is determined by determining whether addresses of physical sectors are continuous. First file invoking request information may be further combined according to sizes of invoked first files. For example, when a sum of sizes of two first files that two first-file invoking request messages request to write may exactly constitute one data block (block), the two first-file invoking request messages may also be combined, and the corresponding first files that the two first-file invoking request messages request to write are written to a same physical sector in a same data block. The present disclosure is not limited thereto.

Optionally, for another example, the file system determines six first-file invoking request messages, that is, L=6. If there are three first-file dispatch queues, that is, M=3, and physical sector information in three first-file invoking request messages of the six first-file invoking request messages shows that addresses of physical sectors of the three first-file invoking request messages are continuous, and the rest three are discontinuous. The three first-file invoking request messages whose physical sectors have continuous addresses are placed into a same first-file dispatch queue, for example, the three first-file invoking request messages are placed in a first first-file dispatch queue, and the rest three first-file invoking request messages whose physical addresses are discontinuous may be allocated to three first-file dispatch queues according to sizes of the first-file invoking request messages or randomly; or may be allocated to three first-file dispatch queues according to correlation of storage addresses of first files that the first-file invoking request messages request to invoke; or may be randomly allocated to three first-file dispatch queues. Then, combination processing is performed on the three first-file invoking request messages whose physical sector information is continuous and that are in the first first-file dispatch queue to obtain one invoking request message of the first-file dispatch queue. The other two first-file dispatch queues may first not be processed, or if first-file invoking request messages that are not combined still exist in the first first-file dispatch queue, processing is also not performed temporarily. When multiple first-file invoking request messages that can be combined exist in the several first-file dispatch queues, similarly, as in the case of the first first-file dispatch queue, multiple first-file invoking request messages in a same first-file dispatch queue are combined. Optionally, whether combination processing is performed is determined by determining whether addresses of physical sectors are continuous. First file invoking request information may be further combined according to sizes of invoked first files. For example, when a sum of sizes of two first files that two first-file invoking request messages request to write may exactly constitute one data block (block), the two first-file invoking request messages may also be combined, and the corresponding first files that the two first-file invoking request messages request to write are written to a same physical sector in a same data block. The present disclosure is not limited thereto.

Optionally, the allocation module 220 may group, according to different process IDs (PID) of the L first-file invoking request messages, the invoking request messages received by the file system, and store a first-file invoking request message of the grouped invoking request messages in the first-file dispatch queue, where the first-file dispatch queue may include M dispatch queues. Optionally, a structure may be newly added to the file system, and is used to determine which invoking request messages are first-file invoking request messages. Alternatively, when a first-file invoking request message is determined in S110, the first-file invoking request message may be identified, the first-file invoking request message is distinguished by using an identifier, and the first-file invoking request message is allocated to the corresponding M first-file dispatch queues, where each first file dispatch may correspondingly include K first-file invoking request messages.

In this embodiment of the present disclosure, for each of the M first-file dispatch queues, the processing module 230 in the file system may process the K first-file invoking request messages included in each first-file dispatch queue, to obtain an invoking request message of each first-file dispatch queue. Specifically, the L first-file invoking request messages are added to the M first-file dispatch queues. For each first-file dispatch queue, when at least two first-file invoking request messages included in each first-file dispatch queue have continuous physical sector (bi_sector) addresses, combination processing may be performed on the at least two first-file invoking request messages, so that the at least two first-file invoking request messages may be combined into one invoking request message, that is, the invoking request message of the first-file dispatch queue, so as to reduce a quantity of times of invoking. For example, for any first-file dispatch queue, the first-file dispatch queue includes K first-file invoking request messages, and the K first-file invoking request messages may be processed according to physical sector information included in the K first-file invoking request messages, to generate one invoking request message of the first-file dispatch queue, where the invoking request message of the first-file dispatch queue is used to invoke first files corresponding to the K first-file invoking request messages. Optionally, the file system may further perform deletion processing on the first-file invoking request message, to delete an unnecessary invoking request. In this way, the quantity of times of invoking may also be reduced.

Optionally, when a first-file dispatch queue includes only one first-file invoking request message, that is, there is no another invoking request message, where a physical sector of the another invoking request message and the physical sector of the invoking request message have continuous addresses, the first-file invoking request message may temporarily not be processed. When addresses of physical sectors of the at least two first-file invoking request messages included in the first-file dispatch queue are continuous, combination processing is then performed. The present disclosure is not limited thereto.

In this embodiment of the present disclosure, after the processing module 230 of the file system performs combination or deletion processing on the K first-file invoking request messages included in the first-file dispatch queue, the invoking module 240 may access a corresponding first file according to the obtained invoking request message of the first-file dispatch queue. Specifically, because each first-file invoking request message may include access path information, after combination is performed for the first-file dispatch queue, the invoking request message of each first-file dispatch queue still has corresponding access path information. Therefore, access processing may be correspondingly performed on the first file according to the access path information. Optionally, the invoking request message of the first-file dispatch queue may be sent to a storage medium request queue (mmc_request), the mmc_request processes the invoking request message of the first-file dispatch queue, and sets a device controller, where the device controller is mainly used to generate and transmit data. After data transmission is completed, a current invoking request message may be deleted from a corresponding dispatch queue, and data transmission corresponding to a next request is started.

Therefore, the apparatus for accessing a file in this embodiment of the present disclosure determines invoking request messages of micro files, and allocates a corresponding first-file dispatch queue to the invoking request messages of the micro files, so that combination and/or deletion processing can be performed on the invoking request messages of the multiple micro files, and a quantity of times of invoking a micro file is reduced. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system.

Optionally, in an embodiment, the apparatus 200 for accessing a file in this embodiment of the present disclosure further includes:

a second determining module 250, configured to determine N first-file storage space groups on the physical sector storing the file, where the N first-file storage space groups are used to store the first file.

In this embodiment of the present disclosure, specifically, the file system may set an independent physical sector for access of a micro file. The physical sector includes multiple independent areas, the area includes multiple first-file storage space groups (MF Group), a size of the area may be adjusted and optimized according to a timeslot application, and a quantity of MF Groups included in the area may be dynamically adjusted according to requirements. Optionally, for multiple MF Groups independently storing micro files, each MF Group may include multiple data blocks (data block), and each data block may store one or more micro files. The present disclosure is not limited thereto.

Specifically, the second determining module 250 may combine and/or delete multiple MF Groups by using a disk defragmenter program (defragment daemon) when the system is idle. For example, the multiple MF Groups may be combined, ensuring that multiple first files are stored on continuous physical sectors, so that a feature of an eMMC may be better used. During running of the system, because of a deletion operation of a file, space in some MF Groups that is used to store files is surplus, that is, most space in the MF Groups is added to a to-be-deleted list. These MF Groups may be combined, to combine data in at least two MF Groups and store the data in one or more MF Groups. Therefore, more space is released, and space utilization is improved.

Optionally, in an embodiment, deletion processing may also be performed on MF Groups. For example, when some micro files existing in an MF Group turns into a macro file, for example, a size of the macro file exceeds a range of 4 M, the MF Group in which the file becomes macro may be found and identified. Then, when traversing the to-be-deleted list, the defragment daemon finds that first files included in the MF Group are all added to the deleted list, so that deletion is performed when no file exists in the MF Group, that is, the MF Groups are empty, and the MF Group is deleted to release a resource.

Optionally, in an embodiment, addition processing may also be performed on an MF Group. For example, when a micro file is newly added, for example, when a macro file turns into a micro file, the defragment daemon first searches multiple MF Groups for an MF Group having surplus space. If available storage space that may enable the micro file to be stored in the MF Group exists, the newly added micro file is stored in the MF Group. If there is no MF Group having surplus space, the defragment daemon adds a new MF Group, where the new MF Group is used to store the micro file and another newly added micro file.

In this embodiment of the present disclosure, the invoking module 240 of the file system may search, according to an invoking request message of at least one first-file dispatch queue, the MF Group storing files for a first file that needs to be accessed and invoked.

It should be understood that the apparatus 200 for accessing a file according to this embodiment of the present disclosure may correspondingly perform the method 100 in the embodiment of the present disclosure, and the foregoing and other operations and/or functions of modules of the apparatus 200 for accessing a file are separately used to implement the corresponding procedures of the methods in FIG. 1 and FIG. 2. For brevity, details are not described herein again.

Therefore, the apparatus for accessing a file in this embodiment of the present disclosure determines invoking request messages of micro files, and allocates a corresponding first-file dispatch queue to the invoking request messages of the micro files, so that combination and/or deletion processing can be performed on the invoking request messages of the multiple micro files. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system. In addition, a corresponding dynamic storage area may be further allocated to a micro file, and different micro files are gathered for storage. In this way, a waste of storage space may be reduced, and space utilization is improved.

Figure 5:
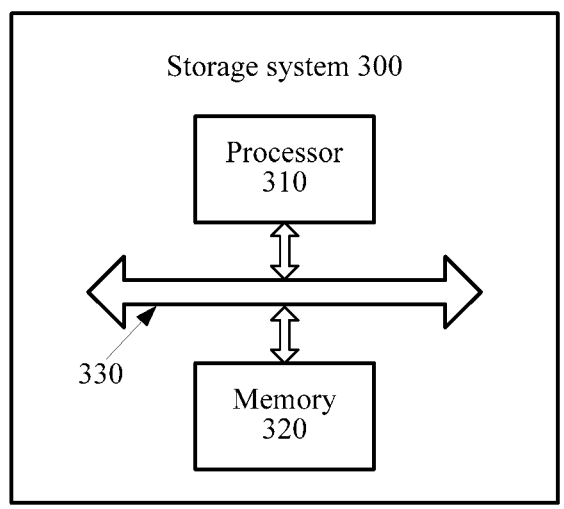
FIG. 5 is a schematic block diagram of a storage system 300 according to an embodiment of the present disclosure.

As shown in FIG. 5, an embodiment of the present disclosure further provides a storage system 300, including a processor 310, a memory 320, and a bus system 330. The processor 310 and the memory 320 are connected to each other by using the bus system 330, the memory 320 is configured to store an instruction, and the processor 310 is configured to execute the instruction stored by the memory 320. The memory 320 stores program code, and the processor 310 may invoke the program code stored in the memory 320 to perform the following operations: determining L first-file invoking request messages, where each of the L first-file invoking request messages is used to request to invoke a first file, a size of the first file is less than or equal to a threshold, each first-file invoking request message includes physical sector information, the physical sector information includes an address of a physical sector storing the first file, and L is an integer greater than 1; separately adding, according to the physical sector information, the L first-file invoking request messages to M first-file dispatch queues corresponding to the L first-file invoking request messages, where M is a positive integer; processing K first-file invoking request messages that are included in each of the M first-file dispatch queues, to obtain an invoking request message of each first-file dispatch queue, where the invoking request message of each first-file dispatch queue is used to request to invoke first files corresponding to the K first-file invoking request messages, and K is a positive integer; and accessing, according to the invoking request message of each first-file dispatch queue, the first files corresponding to the K first-file invoking request messages.

Therefore, the storage system in this embodiment of the present disclosure determines invoking request messages of micro files, and allocates a corresponding first-file dispatch queue to the invoking request messages of the micro files, so that combination and/or deletion processing can be performed on the invoking request messages of the multiple micro files. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system. In addition, a corresponding dynamic storage area may be further allocated to a micro file, and different micro files are gathered for storage. In this way, a waste of storage space may be reduced, and space utilization is improved.

It should be understood that in this embodiment of the present disclosure, the processor 310 may be a central processing unit (CPU), and the processor 310 may be further another general-purpose processor, a digital signal processor (DSP), an application-specific integrated circuit (ASIC), a field-programmable gate array (FPGA) or another programmable logical device, a discrete gate or transistor logical device, a discrete hardware component, or the like. The general purpose processor may be a microprocessor or the processor may be any conventional processor or the like.

The memory 320 may include a read-only memory and a random access memory, and provides an instruction and data to the processor 310. Apart of the memory 320 may further include a non-volatile random access memory. For example, the memory 320 may further store device-type information.

The bus system 330 may include a power bus, a control bus, a status signal bus, and the like in addition to a data bus. However, for purpose of clear description, various types of buses in the figure are all marked as the bus system 330.

In an implementation process, steps of the foregoing methods may be performed by using an integrated logic circuit of hardware in the processor 310 or an instruction in a form of software. Steps of the methods disclosed with reference to the embodiments of the present disclosure may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 320, and the processor 310 reads information in the memory 320 and completes the steps of the foregoing methods in combination with hardware of the processor 310. To avoid repetition, details are not described herein again.

Optionally, in an embodiment, the processor 310 may invoke the program code stored in the memory 320 to perform the following operations: determining N first-file storage space groups on the physical sector storing the file, where the N first-file storage space groups are used to store the first file, and N is a positive integer; and when at least two of the N first-file storage space groups have available storage space, combining first files included in the at least two first-file storage space groups; or when at least one of the N first-file storage space groups does not store a file, releasing the at least one first-file storage space group; or when none of the N first-file storage space groups has available storage space, increasing a quantity of the N first-file storage space groups; and accessing, from the N first-file storage space groups according to the invoking request message of each first-file dispatch queue, the first files corresponding to the K first-file invoking request messages.

Optionally, in an embodiment, the processor 310 may invoke the program code stored in the memory 320 to perform the following operations: adding at least two of the L first-file invoking request messages to a same first-file dispatch queue according to the physical sector information, where addresses of physical sectors of first files that the at least two first-file invoking request messages request to invoke are continuous.

Optionally, in an embodiment, each first-file invoking request message further includes access path information, where the access path information is used to indicate a path, which is used for accessing the first file corresponding to each first file invoking message, of the physical sector.

Optionally, in an embodiment, the processor 310 may invoke the program code stored in the memory 320 to perform the following operations: determining L first-file information nodes, where each of the L first-file information nodes is used to store the access path information of the first file that each first-file invoking request message requests to invoke; and determining, according to each first-file information node, the access path information of the first file that each first-file invoking request message requests to invoke.

Optionally, in an embodiment, the processor 310 may invoke the program code stored in the memory 320 to perform the following operations: determining whether an $i^{th}$ first-file information node of the L first-file information nodes exists in an information node linked list; and when the $i^{th}$ first-file information node does not exist in the information node linked list, creating, in the information node linked list, the $i^{th}$ first-file information node, and storing access path information of an $i^{th}$ first file in the $i^{th}$ first-file information node; or when the $i^{th}$ first-file information node exists in the information node linked list, determining access path information of an $i^{th}$ first file according to the $i^{th}$ first-file information node.

Therefore, the storage system in this embodiment of the present disclosure determines invoking request messages of micro files, and allocates a corresponding first-file dispatch queue to the invoking request messages of the micro files, so that combination and/or deletion processing can be performed on the invoking request messages of the multiple micro files. In this way, it can be avoided that a quantity of I/O times is increased and excessive memory resources are occupied because micro file invoking requests increase, a quantity of times of system invoking can be reduced, a quantity of times of system invoking is reduced, and a throughput of I/O requests is increased, thereby increasing overall I/O efficiency of a file system. In addition, a corresponding dynamic storage area may be further allocated to a micro file, and different micro files are gathered for storage. In this way, a waste of storage space may be reduced, and space utilization is improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for accessing a file, the method comprising:
   determining L number of first file invoking request messages each for requesting to invoke a corresponding first file, wherein a size of the first file is less than or equal to a threshold, and each first-file invoking request message comprises physical sector information, the physical sector information comprising an address of a physical sector storing the first file, and L being an integer greater than 1;
   separately adding, according to the physical sector information, the L number of first-file invoking request messages to M number of first-file dispatch queues corresponding to the L number of first-file invoking request messages, wherein M is a positive integer;
   processing K number of first-file invoking request messages in each of the M number of first-file dispatch queues, to obtain an invoking request message of each first-file dispatch queue, the invoking request message of each first-file dispatch queue for requesting to invoke first files corresponding to the K first-file invoking request messages, and K is a positive integer; and
   accessing, according to the invoking request message of each first-file dispatch queue, the first files corresponding to the K number of first-file invoking request messages.

2. The method according to claim 1, wherein the method further comprises:
   determining N number of first-file storage space groups on the physical sector storing the first files, wherein is a positive integer, and wherein the method further comprises one of the following:
     combining first files in at least two of the N first-file storage space groups when the at least two first-file storage space groups have available storage space;
     releasing at least one of the N first-file storage space group when the at least one first-file storage space groups does not store a file; and
     increasing a quantity of the N first-file storage space groups when none of the N first-file storage space groups has available storage space; and, wherein
   accessing, according to the invoking request message of each first-file dispatch queue, the first files corresponding to the K first-file invoking request messages comprises:
     accessing, from the N first-file storage space groups according to the invoking request message of each first-file dispatch queue, the first files corresponding to the K first-file invoking request messages.

3. The method according to claim 1, wherein separately adding, according to the physical sector information, the L number of first-file invoking request messages to M number of first-file dispatch queues corresponding to the L first-file invoking request messages comprises:
   adding at least two of the L number of first-file invoking request messages to a same first-file dispatch queue according to the physical sector information, wherein addresses of physical sectors of first files that the at least two first-file invoking request messages request to invoke are continuous.

4. The method according to claim 1, wherein each first-file invoking request message further comprises access path information indicating a path for accessing the first file corresponding to each first file invoking request message.

5. The method according to claim 4, wherein determining the L number of first-file invoking request messages comprises:
   determining L number of first-file information nodes, each for storing the access path information of the first file that each first-file invoking request message requests to invoke; and
   determining, according to each first-file information node, the access path information of the first file each first-file invoking request message requests to invoke.

6. The method according to claim 5, wherein determining the L number of first-file information nodes comprises:
   determining whether an $i^{th}$ first-file information node of the L number of first-file information nodes exists in an information node linked list; and, wherein the method further comprises one of the following:
     creating, in the information node linked list, the $i^{th}$ first-file information node, and storing access path information of an $i^{th}$ first file in the $i^{th}$ first-file information node when the $i^{th}$ first-file information node does not exist in the information node linked list; and
     determining access path information of an $i^{th}$ first file according to the $i^{th}$ first-file information node when the $i^{th}$ first-file information node exists in the information node linked list.

7. An apparatus for accessing a file, the apparatus comprising:
   a first determining module, configured to determine L number of first file invoking request messages each for requesting to invoke a corresponding first file, wherein a size of the first file is less than or equal to a threshold, and each first-file invoking request message comprises physical sector information, the physical sector information comprising an address of a physical sector storing the first file, and L being an integer greater than 1;

an allocation module, configured to separately add, according to the physical sector information, the L number of first-file invoking request messages to M number of first-file dispatch queues corresponding to the L number of first-file invoking request messages, wherein M is a positive integer;

a processing module, configured to process K number of first-file invoking request messages in each of the M first-file dispatch queues allocated by the allocation module, to obtain an invoking request message of each first-file dispatch queue, wherein the invoking request message of each first-file dispatch queue for requesting to invoke first files corresponding to the K number of first-file invoking request messages, and K is a positive integer; and an invoking module, configured to access, according to the invoking request message, which is obtained by the processing module, of each first-file dispatch queue, the first files corresponding to the K number of first-file invoking request messages.

8. The apparatus according to claim 7, wherein the apparatus further comprises:
a second determining module, configured to: determine N number of first-file storage space groups on the physical sector storing the file; and to perform one of the following:
combining first files in at least two of the N number of first-file storage space groups when the at least two first-file storage space groups have available storage space;
releasing at least one of the N first-file storage space group when the at least one first-file storage space groups does not store a file; and
increasing a quantity of the N first-file storage space groups when none of the N first-file storage space groups has available storage space; and
the invoking module is further configured to:
access, from the N first-file storage space groups according to the invoking request message of each first-file dispatch queue, the first files corresponding to the K first-file invoking request messages.

9. The apparatus according to claim 7, wherein the processing module is configured to:
add at least two of the L number of first-file invoking request messages to a same first-file dispatch queue according to the physical sector information, wherein addresses of physical sectors of first files that the at least two first-file invoking request messages request to invoke are continuous.

10. The apparatus according to claim 7, wherein each first-file invoking request message further comprises access path information indicating a path for accessing the first file corresponding to each first file invoking request message.

11. The apparatus according to claim 10, wherein the determining module is configured to:
determine L number of first-file information nodes each for storing the access path information of the first file that each first-file invoking request message requests to invoke; and determine, according to each first-file information node, the access path information of the first file that each first-file invoking request message requests to invoke.

12. The apparatus according to claim 11, wherein the determining module is configured to:
determine whether an $i^{th}$ first-file information node of the L number of first-file information nodes exists in an information node linked list; and to perform one of the following:
creating, in the information node linked list, the $i^{th}$ first-file information node, and storing access path information of an $i^{th}$ first file in the $i^{th}$ first-file information node when the $i^{th}$ first-file information node does not exist in the information node linked list; and
determining access path information of an $i^{th}$ first file according to the $i^{th}$ first-file information node when the $i^{th}$ first-file information node exists in the information node linked list.

13. A storage system, comprising:
a memory, configured to store a file and a program; and
a processor, configured to execute the program and to:
determine L number of first file invoking request messages each for requesting to invoke a corresponding first file, wherein a size of the first file is less than or equal to a threshold, and each first-file invoking request message comprises physical sector information, the physical sector information comprising an address of a physical sector storing the first file, and L being an integer greater than 1,
separately add, according to the physical sector information, the L number of first-file invoking request messages to M number of first-file dispatch queues corresponding to the L number of first-file invoking request messages, wherein M is a positive integer,
process K number of first-file invoking request messages in each of the M number of first-file dispatch queues, to obtain an invoking request message of each first-file dispatch queue, the invoking request message of each first-file dispatch queue for requesting to invoke first files corresponding to the K first-file invoking request messages, and K is a positive integer, and
access, according to the invoking request message of each first-file dispatch queue, the first files corresponding to the K first-file invoking request messages.

14. The storage system according to claim 13, wherein the processor is further configured to:
determine N number of first-file storage space groups on the physical sector storing the file;
perform one of the following:
combining first files comprised in at least two of the N number of first-file storage space groups when the at least two first-file storage space groups have available storage space;
releasing at least one of the N first-file storage space group when the at least one first-file storage space groups does not store a file; or
increasing a quantity of the N first-file storage space groups when none of the N first-file storage space groups has available storage space; and
access, from the N first-file storage space groups according to the invoking request message of each first-file dispatch queue, the first files corresponding to the K number of first-file invoking request messages.

15. The storage system according to claim 13, wherein the processor is configured to:
   add at least two of the L number of first-file invoking request messages to a same first-file dispatch queue according to the physical sector information, wherein addresses of physical sectors of first files that the at least two first-file invoking request messages request to invoke are continuous.

16. The storage system according to claim 13, wherein each first-file invoking request message further comprises access path information indicating a path for accessing the first file corresponding to each first file invoking request message.

17. The storage system according to claim 16, wherein the processor is configured to:
   determine L number of first-file information nodes for storing the access path information of the first file that each first-file invoking request message requests to invoke; and
   determine, according to each first-file information node, the access path information of the first file that each first-file invoking request message requests to invoke.

18. The storage system according to claim 17, wherein the processor is configured to:
   determine whether an $i^{th}$ first-file information node of the L number of first-file information nodes exists in an information node linked list; and to perform one of:
   creating, in the information node linked list, the $i^{th}$ first-file information node, and storing access path information of an $i^{th}$ first file in the $i^{th}$ first-file information node when the $i^{th}$ first-file information node does not exist in the information node linked list; and
   determining access path information of an $i^{th}$ first file according to the $i^{th}$ first-file information node when the $i^{th}$ first-file information node exists in the information node linked list.

* * * * *